US012652353B2

(12) United States Patent
Kassym et al.

(10) Patent No.: US 12,652,353 B2
(45) Date of Patent: Jun. 9, 2026

(54) TRANSFER OF A VOICE CALL AT A SOFTWARE AS A SERVICE PLATFORM

(71) Applicant: Twilio Inc., San Francisco, CA (US)

(72) Inventors: Gapur Kassym, Tallinn (EE);
Selahattin Can Çitoğlu, Tallinn (EE);
Marc Devens, Jersey City, NJ (US)

(73) Assignee: Twilio Inc., San Francisco, CA (US)

( * ) Notice: Subject to any disclaimer, the term of this patent is extended or adjusted under 35 U.S.C. 154(b) by 125 days.

(21) Appl. No.: 18/532,775

(22) Filed: Dec. 7, 2023

(65) Prior Publication Data

US 2025/0193314 A1    Jun. 12, 2025

(51) Int. Cl.
H04M 3/00          (2024.01)
H04M 3/54          (2006.01)

(52) U.S. Cl.
CPC ..................................... H04M 3/54 (2013.01)

(58) Field of Classification Search
CPC ...................................................... H04M 3/54
USPC ............. 379/212.01, 211.02, 214.01, 215.01
See application file for complete search history.

(56) References Cited

U.S. PATENT DOCUMENTS

| | | | | |
|---|---|---|---|---|
| 11,616,752 | B1 * | 3/2023 | Seok ........................ | H04L 51/56 |
| | | | | 709/206 |
| 11,855,982 | B2 * | 12/2023 | Gadwale ............... | H04W 12/06 |
| 11,943,182 | B1 * | 3/2024 | Jansson ............... | H04M 7/0054 |
| 2009/0113460 | A1 * | 4/2009 | Parrish ................... | H04L 69/03 |
| | | | | 719/328 |
| 2015/0071427 | A1 | 3/2015 | Kelley et al. | |
| 2015/0256677 | A1 | 9/2015 | Konig et al. | |
| 2018/0234550 | A1 | 8/2018 | Lifson et al. | |
| 2020/0112450 | A1 * | 4/2020 | Chhabra ............... | H04L 65/403 |
| 2021/0176358 | A1 * | 6/2021 | Sanderlin ............ | H04M 3/5166 |
| 2021/0306331 | A1 * | 9/2021 | Gadwale ................ | H04L 63/18 |
| 2021/0352116 | A1 * | 11/2021 | Merten ............... | H04L 65/1073 |
| 2022/0138431 | A1 * | 5/2022 | Setayesh ................ | G06F 9/542 |
| | | | | 707/739 |
| 2023/0421519 | A1 * | 12/2023 | Savin ..................... | H04L 51/216 |
| 2024/0236020 | A1 * | 7/2024 | Jansson ................. | H04L 51/216 |
| 2024/0348602 | A1 * | 10/2024 | Gadwale ................ | H04M 3/51 |

OTHER PUBLICATIONS

International Search Report and Written Opinion for International Application No. PCT/US2024/058749, mailed Apr. 3, 2025, 13 Pages.

* cited by examiner

*Primary Examiner* — William J Deane, Jr.
(74) *Attorney, Agent, or Firm* — Lowenstein Sandler LLP

(57)          ABSTRACT

A voice call between a customer device and a first client device associated with a first user account of a communication services platform is established via the communication services platform. A first request to transfer the voice call with the customer device to a second client device associated with the first user account is received via an application programming interface (API) call. Responsive to receiving the first request to transfer the voice call, the voice call between the customer device and the second client device associated with the first user account is established via the communication services platform.

20 Claims, 5 Drawing Sheets

100

200

TRANSFER OF A VOICE CALL AT A SOFTWARE AS A SERVICE PLATFORM

TECHNICAL FIELD

Aspects and embodiments of the disclosure relate to computer networking, and more specifically, to systems and methods for transferring a voice call at a software as a service (SaaS) platform.

BACKGROUND

Voice call technology can include voice calls over a public switched telephone network (PSTN) and voice over Internet Protocol (VoIP) to deliver voice communications and multimedia sessions over Internet Protocol (IP) networks.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

DETAILED DESCRIPTION

Figure 1:
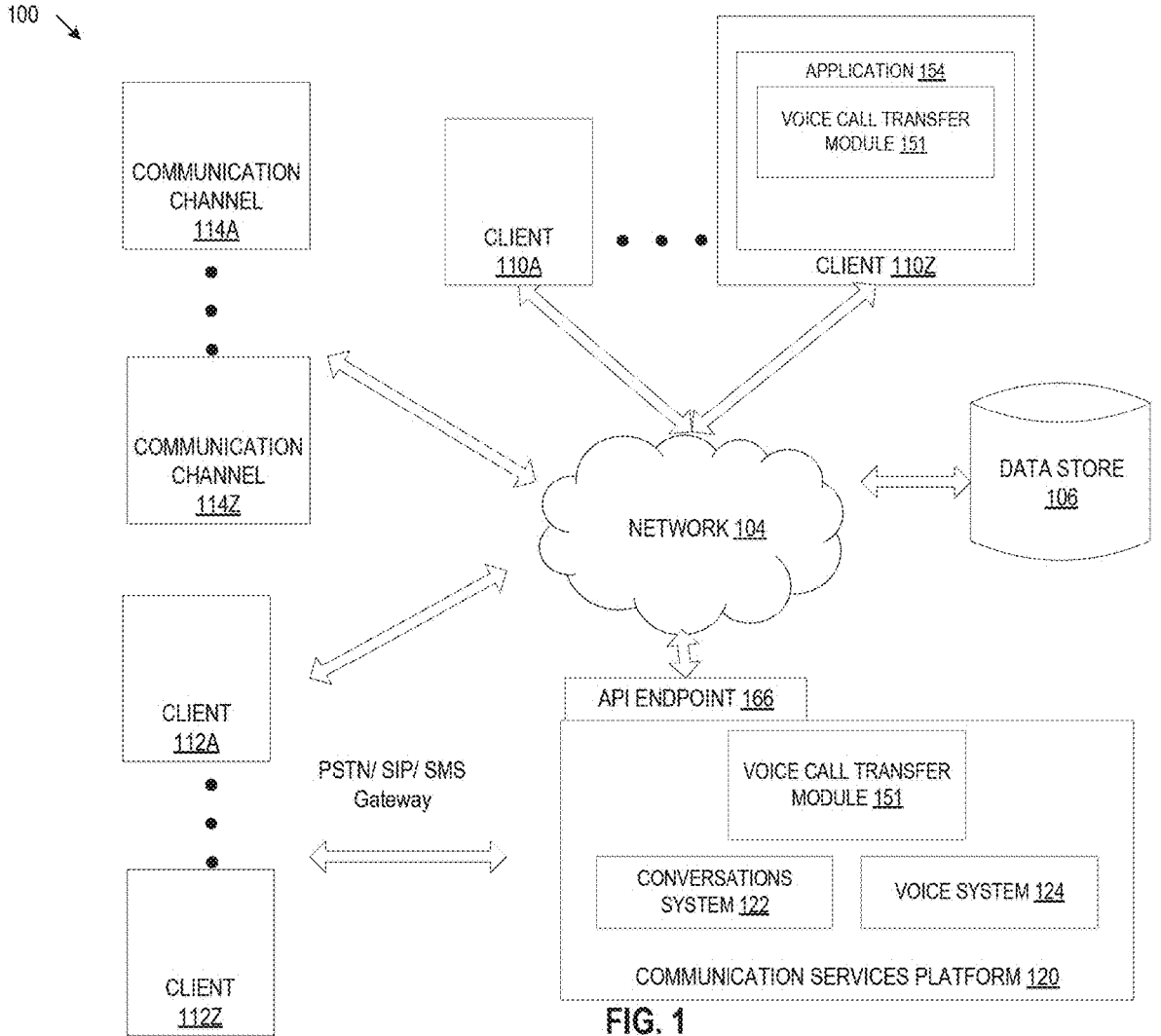
FIG. 1 illustrates an example system architecture, in accordance with some embodiments of the disclosure.

A communication services platform, such as a Software as a Service (SaaS) platform, can offer various communication services to users. For example, a SaaS platform can offer messaging service tools that facilitate messaging conversations, e.g., the sending and/or receiving of messages, such as SMS messages, MMS messages, and/or IM messages, to and from devices via various communication channels. A communication channel can refer to a form of communication that uses one or more of a particular protocol, a particular underlying technology or is provided by a particular entity (e.g., third-party entity). Different communication channels can refer to different forms of communication that can use one or more of different communication protocols, different underlying technologies (e.g., SMS vs IP), or are provided by different entities, such as a third-party entity, that offer services, software or hardware (or a combination thereof) through which messages can be exchanged between recipient devices. For instance, the SaaS platform may send a text message (e.g., SMS message) to a recipient device using a communication channel, such as a telecommunications carrier network or send an instant message to a recipient device using an IM communication channel (e.g., using an application programming interface (API) to communicate with the IM communication channel). Examples of channels can include Public Switched Telephone Network (PSTN) based channels such as SMS or MMS, Internet Protocol (IP) based channels, and proprietary channels (e.g., proprietary social media messaging applications).

A SaaS platform can also offer communication services such as voice services that include routing inbound and outbound voice calls. In addition to routing voice calls, voice services can include transcription services, conference call services, recording services, interactive voice recognition (IVR) services, text-to-speech services, among others. For instance, the SaaS platform can provision telephone numbers to an organization (e.g., entity) and the provisioned telephone numbers can be assigned, often dynamically, to various user accounts of the organization. The organization may, via APIs, configure user-defined routing logic that can specify rules detailing how the SaaS platform is to route particular voice calls and/or execute particular voice services before, during, and/or after the voice calls.

Clients of a SaaS platform may subscribe to one or more voice services that allow the clients, via client devices, to receive inbound voice calls from customers (e.g., customers of the client) and place outbound voice calls to customers. The inbound and outbound voice calls can be orchestrated by the SaaS platform such that to establish the voice call between the client device and customer device a connection between the SaaS platform and the customer device is established and a connection between the SaaS platform and the client device is also established.

In many cases, for a voice call between the customer device and client device, the customer device and client device can use different communication systems. Such communication systems can have no or limited interoperability, which can cause challenges in providing voice services for the voice call. A voice service such as transferring voice calls among devices is a desirable service that can be challenging to implement generally, and particularly challenging to implement for voice calls between devices using different communication systems.

Aspects of the disclosure address the above-mentioned and other challenges by providing infrastructure that uses application programming interface (API) calls to establish, via a communication services platform, a voice call between a first client device and customer device, and to transfer the voice call to establish the voice call between a second client device and the customer device. In some embodiments, the voice call between the first client device (or second client device) and customer device includes a first connection between the communication services platform and the client device using a first communication platform (e.g., using Voice over Internet Protocol (VoIP) over a network) and includes a second connection between the communication services platform and the customer device using a second communication platform (e.g., a public switched telephone network (PSTN)).

In some embodiments, a voice call between a customer device and a first client device can be established via the communication services platform. The first client device can be associated with a user account of the communication services platform. The communication services platform can receive an API call requesting to transfer the voice call with the customer device to another client device, such as a second client device that is associated with the same user account as the first client device. Responsive to the request, communication services platform can establish the voice call between the customer device and the second client device. In some embodiments, the voice call between the first client device and the customer device can be disconnected. In some embodiments, the voice call between the first client device and the customer device can be maintained (e.g., conference call) and the audio from the first client device can be muted.

In some embodiments, one or more of the first client device or the second client device can be assigned as the host device. The host device is permitted to end the voice call for a non-host device. For instance, the second client device is assigned as the host device and the first client device is assigned as a non-host device. If the second client device disconnects from the voice call, communication services platform will automatically disconnect the voice call between the first client device and customer device. If the first client device disconnects from the voice call, the communication services platform will maintain the voice call between the second client device and the customer device.

In an illustrative example, an organization can use communication services platform for voice services for the organization's customer service department. Such voice services can include routing incoming voice calls (e.g., using user-defined routing logic) from a customer device to a client device selected among multiple client devices associated with available agents of the customer service department. A particular voice call can be routed and established between a client device (using VoIP of the communication services platform) of an available agent and the customer device (using a PSTN of a carrier network). For instance, the available agent can take the voice call at the agent's desktop computer via a web-based application (e.g., browser-based application) of the communication services platform. As the voice call progresses, the agent can determine that to effectively address the customer's concerns, the agent will preferably walk to the warehouse and continue discussing the issue with the customer at the warehouse. To transfer the voice call to the agent's mobile phone, the agent can initiate (e.g., using an API call) the transfer of the voice call to the agent's mobile device either from the agent's desktop device or from the agent's mobile phone via a native application of the communication services platform. The voice call can be transferred to the agent's mobile device such that the voice call can be continued between the customer device and the mobile device. The voice call between the desktop device and the customer device can be muted or disconnected. In some instances, the mobile device can be assigned as the host device.

As noted, a technical problem addressed by some embodiments of the disclosure is providing voice services such as transferring voice calls, and in particular transferring a voice call between devices that use different communication systems.

A technical solution to the above-identified technical problem may include providing API calls that facilitate the transfer of the voice call among client devices of the communication services platform.

Thus, the technical effect may include developing and modifying technical infrastructure that allows a voice system to provide voice services to devices using different communication systems, and in particular to transfer a voice call between a client device using a first communication system and a customer device using a second communication system that is different from the first communication system.

FIG. 1 illustrates an example system architecture 100, in accordance with some embodiments of the disclosure. The system architecture 100 (also referred to as "system" herein) includes a communication services platform 120, a data store 106, client devices 110A-110Z connected to a network 104, client devices 112A-112Z communicatively coupled to communication services platform 120, and communication channels 114A-114Z coupled to the network 104 (or otherwise communicatively coupled to other elements of the system 100).

In embodiments, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, data store 106 is a persistent storage that is capable of storing data as well as data structures to tag, organize, and index the data. Data store 106 may be hosted by one or more storage devices, such as main memory, magnetic or optical storage based disks, tapes or hard drives, NAS, SAN, and so forth. In some embodiments, data store 106 may be a network-attached file server, while in other embodiments data store 106 may be some other type of persistent storage such as an object-oriented database, a relational database, and so forth, that may be hosted by communication services platform 120 or one or more different machines coupled to the communication services platform 120 via the network 104.

The client devices 110A-110Z (generally referred to as "client device(s) 110" herein) may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some embodiments, client devices 110 can be one or more computing devices (such as a rackmount server, a router computer, a server computer, a personal computer, a mainframe computer, a laptop computer, a tablet computer, a desktop computer, etc., data stores (e.g., hard disks, memories, databases), networks, software components, or hardware components. In some embodiments, client devices 110A through 110Z may also be referred to as "user devices."

In some embodiments, a client device, such as client device 110Z, can implement or include one or more applications, such as application 154 (also referred to as "client application 154" herein) executed at client device 110Z. In some embodiments, application 154 can be used to communicate (e.g., send and receive information) with communication services platform 120. In some embodiments, application 154 can implement user interfaces (e.g., graphical user interfaces (GUIs)) that may be webpages rendered by a web browser and displayed on the client device 110Z in a web browser window. In another embodiment, the user interfaces of client application 154 may be included in a stand-alone application downloaded to the client device 110Z and natively running on the client device 110Z (also referred to as a "native application" or "native client application" herein).

In some embodiments, client devices 110 can communicate with communication services platform 120 using one or more function calls, such as application programming interface (API) function calls (also referred to as "API calls" herein). For example, the one or more function calls can be identified in a request using one or more application layer protocols, such a HyperText Transfer Protocol (HTTP) (or HTTP secure (HTTPS)), and that are sent to the communication services platform 120 from the client device 110Z implementing application 154. In some embodiments, the communication services platform 120 can respond to the requests from the client device 110Z by using one or more API responses using an application layer protocol. Similarly, communication services platform 120 can communicate with one or more communication channels 114A-114Z using API function calls.

In some embodiments, one or more of client devices 110 can be identified by a uniform resource identifier (URI), such as a uniform resource locator (URL). For example, communication services platform 120 can send an API call to client device 110Z addressed to a URL specific to the client device 110Z. In some embodiments, the communication services platform 120 can be identified by a URI. For instance, the API call sent by a client device 110 to communication services platform 120 can be directed to the URL of communication services platform 120.

In some embodiments, the APIs used to access the conversations system 122 of the communication services platform 120 can be different from the APIs used to access the voice system 124 of communication services platform 120. In some embodiments, the APIs used by application 154 executed on a desktop client device (e.g., desktop application) to access the voice system 124 can be different APIs than the APIs used by application 154 executed on a mobile client device (e.g., mobile application) to access the voice system 124. In some embodiments, conversations system 122 and voice system 124 can communicate between one another using APIs. In some embodiments, the APIs used to communicate between conversations system 122 and voice system 124 may be private APIs that are not accessible by client devices 110 (or client devices 112).

In some embodiments, client devices 112A-112Z (generally referred to as "client device(s) 112" herein) may be similar to client devices 110. In some embodiments, client devices 112 can include one or more telephony devices. A telephony device can include a Public Switched Telephone Network (PSTN)—connected device, such as a landline phone, cellular phone, or satellite phone, for example. In some embodiments, a telephony device can also include an internet addressable voice device (e.g., non-PSTN telephony device), such as Voice-Over-Internet-Protocol (VOIP) phones, or Session Initiation Protocol (SIP) devices, for example. In some embodiments, a telephony device can include one or more messaging devices, such as a Short Message Service (SMS) network device that, for example, uses a cellular service to exchange SMS messages or Multimedia Messaging Service (MMS) messages.

In some embodiments, the communication services platform 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to data or services. Such computing devices may be positioned in a single location or may be distributed among many different geographical locations. For example, communication services platform 120 may include a plurality of computing devices that together may comprise a hosted computing resource, a grid computing resource or any other distributed computing arrangement. In some embodiments, communication services platform 120 may correspond to an elastic computing resource where the allotted capacity of processing, network, storage, or other computing-related resources may vary over time.

In some embodiments, communication services platform 120 provides one or more API endpoints 166 that can expose services, functionality or content of the communication services platform 120 to one or more of client devices 110 or communication channels 114A-114Z. In some embodiments, an API endpoint 166 can be one end of a communication channel, where the other end can be another system, such as a client device 110Z or communication channel 114Z. In some embodiments, the API endpoint 166 can include or be accessed using a resource locator, such a universal resource locator (URL), of a server or service. The API endpoint 166 can receive requests from other systems, and in some cases, return a response with information responsive to the request. In some embodiments, HTTP or HTTPS methods can be used to communicate to and from API endpoint 166.

In some embodiments, the API endpoint 166 (also referred to as a "request interface" herein) can function as a computer interface through which communication requests, such as message and/or voice requests, are received and/or created. The communication services platform 120 may include one or more types of API endpoints.

In some embodiments, the API endpoint 166 can include a messaging API and/or voice API whereby external entities or systems can send a communication to create message content and/or request sending of a message and/or request voice services that are provided via voice system 124. The API (e.g., message API and/or voice API) may be used in programmatically creating message content and/or requesting sending of one or more messages and/or requesting the transfer or joining client device(s) to a voice call. In some embodiments, the API is implemented in connection with a multitenant communication service wherein different accounts (e.g., authenticated entities) can submit independent requests. These requests made through the API can be managed with consideration of other requests made within an account and/or across multiple accounts on the communication service.

In some embodiments, the API of the API endpoint 166 may be used in initiating general messaging or communication requests. For example, a messaging request may indicate one or more destination endpoints (e.g., recipient phone numbers), message content (e.g., text and/or media content), and possibly an origin endpoint (e.g., a phone number to use as the "sending" phone number).

In some embodiments, the API of the API endpoint 166 may be any suitable type of API such as a REST (Representational State Transfer) API, a GraphQL API, a SOAP (Simple Object Access Protocol) API, and/or any suitable type of API. In some embodiments, the communication services platform 120 can expose through the API, a set of API resources which when addressed may be used for requesting different actions, inspecting state or data, and/or otherwise interacting with the communication platform.

In some embodiments, a REST API and/or another type of API may work according to an application layer request and response model. An application layer request and response model may use HTTP (Hypertext Transfer Protocol), HTTPS (Hypertext Transfer Protocol Secure), SPDY, or any suitable application layer protocol. Herein HTTP-based protocol is described for purposes of illustration rather than limitation. The disclosure should not be interpreted as being limited to the HTTP protocol. HTTP requests (or any suitable request communication) to the communication services platform 120 may observe the principles of a RESTful design or the protocol of the type of API. RESTful is understood in this document to describe a Representational State Transfer architecture. The RESTful HTTP requests may be stateless, thus each message communicated contains all necessary information for processing the request and generating a response. The API service can include various resources, which act as endpoints that can specify requested information or requesting particular actions. The resources can be expressed as URI's or resource paths. The RESTful API resources can additionally be responsive to different types of HTTP methods such as GET, PUT, POST and/or DELETE.

In some embodiments, the API endpoint 166 can include a request instruction module that can be called within an application, script, or other computer instruction execution. For example, a computing platform may support the execution of a set of program instructions where at least one instruction within a script or other application logic is used in specifying a message request and communicating that request.

In some embodiments, the API endpoint 166 can include a console, administrator interface, or other suitable type of user interface. Such a user-facing interface can be a graphical user interface. Such a user interface may additionally work in connection with a programmatic interface In some embodiments, a request, such as a message request, can include a data object characterizing the properties of a message. In some embodiments, the communication services platform 120 is associated with message requests that are programmatically initiated (e.g., an application-to-person (A2P) message). In some embodiments, the message request could be one initiated from an inbound received message.

In some embodiments, a request (e.g., message request and/or voice request) can include one or more of one or more destination endpoints, one or more origin endpoints, and message content and/or audio content. In some embodiments, one or more of these properties may be specified indirectly such as through system or account configuration or identifier (e.g., messaging conversation identifier). For example, all messages may be automatically assigned an origin endpoint that is associated with an account. In some embodiments, the message content can include any suitable type of media content including, text, audio, image data, video data, multimedia, interactive media, data, and/or any suitable type of message content.

In an illustrative example, used for illustration rather than limitation, communication services platform 120 can include a Software as a Service (SaaS) platform that can at least in part provide one or more services, such as communication services, to one or more clients. The SaaS platform may deploy services, such as software applications, to one or more clients for use as an on-demand service. For example, the SaaS platform may deliver and/or license software applications on a subscription basis while also hosting, at least in part, the software application. The licensed software applications can, at least in part, be hosted on the infrastructure, such as the cloud computing resources of the SaaS platform.

In some embodiments, communication services platform 120, as noted above, can provide communication services that include, but are not limited to, voice services, messaging services (e.g., SMS services or MMS services), email services, video services, chat messaging services (e.g., internet-based chat messaging services), or a combination thereof. Communication operations using the communication services can use one or more of a communication network (e.g., Internet), telecommunications network (e.g., such as a cellular network, satellite communication network, or landline communication network), or a combination thereof, to transfer communication data between parties.

In some embodiments, the conversations system 122 can function to interface with one or more communication network(s) and/or service(s) for communication of a conversation (e.g., a messaging conversation, such as SMS, MMS, and/or chat messaging). In some embodiments, the conversations system 122 can include an interface to one or more carrier-based communication routes used in sending SMS, MMS, and/or other carrier-based messages. There may be multiple carrier-based communication routes that serve as different optional "routes" when sending communications over a carrier-based network (e.g., a mobile network). The conversations system 122 may additionally or alternatively include an interface to one or more over-the-top (OTT) communication channels which may be offered by a third-party messaging platform (e.g., proprietary social media messaging, messaging applications, etc.).

A route can refer to a communication delivery path, defined by a series of one or more of computers, routers, gateways and/or carrier networks through which the communication is transferred from a source computer to a destination computer (e.g., through which the transmission of a message occurs). For example, the same route may be used to transfer messages using different communication channels, and the same communication channel may be used to transfer messages using different routes. In some example embodiments, different channels correspond to different applications on a receiving device. For example, a smart phone may have one application to handle SMS messages, another application to handle email, and a third application to handle voicemail. Alternatively, some applications may handle multiple communication channels. For example, one application may handle both SMS and MMS messages.

In some embodiments, when the conversations system 122 elects to send a message using a carrier-based channel, the message is communicated to an appropriate carrier connection for routing to the destination endpoint. Carrier-based channels can use SMPP (Short Message Peer-to-Peer protocol) for communicating to an aggregator or another suitable gateway such that the SMS/MMS message is transferred over a carrier network. Once transmitted to the carrier network, the message can be relayed appropriately to arrive at the intended destination. A message in transit may have multiple routing segments that are used in the delivery to an end destination device.

For example, the conversations system 122 can include an interface to one or more SMS Gateways that enable a computer to send and receive SMS text messages to and from a SMS capable device over the global telecommunications network (normally to a mobile phone). The SMS Gateway translates the message sent and makes it compatible for delivery over the network to be able to reach the recipient. The different SMS gateways (or more generally message gateways) can serve as different route options when the conversations system 122 is determining a channel and/or route to be used for one or more message transmissions.

In some embodiments, SMS Gateways can route SMS text messages to the telco networks via an SMPP interface that networks expose, either directly or via an aggregator that sells messages to multiple networks. SMPP, or Short Message Peer-to-Peer, is a protocol for exchanging SMS messages between Short Message Service Centers (SMSCs) and/or External Short Messaging Entities (ESMEs).

In some embodiments, the destination of a message may be used in determining the candidate message routes (and/or channels). For example, a phone number of a destination endpoint or another identifier associated with the intended recipient of the message may be used to identify the destination network of the intended recipient. Each destination network may be assigned a Mobile Country Code (MCC)/ Mobile Network Code (MNC) pair that identifies the specific destination network In some embodiments, communication services platform 120 includes a conversations system 122 that can use the phone number associated with the intended recipient of the message to lookup the MCC/MCN pair identifying the destination network. For example, the conversations system 122 can determine the MCC/MNC pair using an MCC/MNC directory that lists the MCC/MNC pair corresponding to each phone number. In some embodiments, the MCC/MNC directory may be stored in a routing provider storage. Alternatively, the MCC/MNC directory may be stored at some other network accessible location. In either case, the conversations system 122 can use the phone number associated with the intended recipient of the message to query the MCC/MNC directory and identify the MCC/MNC pair that identify the corresponding destination network.

In some embodiments, the conversations system 122 can use the MCC/MNC pair retrieved from the MCC/MNC directory to identify candidate routing providers and routes that are available to deliver a message to the destination network identified by MCC/MNC pair. For example, the routing provider storage may include a routing provider directory that lists each MCC/MNC pair serviced by the conversations system 122 and the corresponding routing providers and routes available for use with each MCC/MNC pair. That is, the routing provider directory can list the routing providers and routes that are available to the conversations system 122 to deliver messages to the destination network identified by each MCC/MNC pair listed in the routing provider directory.

In some embodiments, voice system 124 of communication services platform 120 can enable the placement of an outbound voice call and/or routing of an inbound voice call. A voice call (also referred to as a "call" herein) can refer to a telephone call between at least two user devices to communicate two-way voice data (e.g., voice sound) in realtime. An outbound voice call can refer to a voice call from a client device 110 associated with an account (e.g., one or more of an organization's account or user account) of the communication services platform 120, and to another device that may not be associated with an account. An inbound voice call can refer to a voice call from a device that may not be associated with an account, and to a client device 110 associated with an account. It can be appreciated that a voice call between two client devices 110 that are associated with an account can be performed using communication services platform 120. Such voice calls can be considered inbound or outbound voice calls relative to the particular client device 110.

In some embodiments, voice system 124 can include one or more voice services used in conjunction with a voice call. In some embodiments, the one or more voice services can include a transcription service that transcribes speech to text. In some embodiments, the one or more voice services can include a recording services that can record the audio data of the voice call. In some embodiments, the one or more voice services can include a voice call queue service that can queue inbound voice calls and release the queued voice call pursuant to user-defined logic. In some embodiment, the one or more voice services can include voice mailbox services that store voice messages of at least inbound calls. In some embodiments, the one or more voice services can include an interactive voice response (IVR) service that interacts with callers and gathers information for them by giving the callers choices via a menu, and then performs the actions based on the answers of the caller through the telephone keypad or through voice response. For example, the IVR service can allow a caller to interact with the back-end telephony system, such as voice system 124, by pressing keys that emit dual-tone multi-frequency (DTMF) signals or saying words that are processed by a speech recognition system. In some embodiments, the one or more voice services can include conference call service that can connect three or more devices in a single call.

In some embodiments, communication services platform 120 can include a multitenant system. Multitenancy can refer to a mode of operation of software applications where multiple independent instances of one or multiple applications operate in a shared computer environment. In some embodiments, the instances (tenants) can be logically isolated, but physically integrated. The degree of logical isolation can be complete, but the degree of physical integration can vary. The tenants (application instances) can be representations of organizations that obtain access to the multitenant system. The tenants may also be multiple applications competing for shared underlying resources. Multiple organizations can access the resources of communication services platform 120 without any indication that the resources are shared between the multiple organizations. The data of each of the organizations can be logically isolated from one another such that each organization has access to their own data but not the data of other organizations in the multitenant system. In some embodiments, communication services platform 120 can include a single tenant system.

An organization can be an example of an entity, such as a legal entity, that includes multiple people and that has a particular purpose. A non-limiting example of an organization includes a corporation (e.g., authorized by law to act as a single entity or legal entity). In some embodiments, multiple organizations can include one or more organizations that are independent or distinct from the other organizations. For example, a first organization can be corporation A and a second organization can be corporation B. Corporation A can be considered an independent legal entity from corporation B. Each of corporation A and corporation B can make independent decisions and have a different legal or corporate structure.

In some embodiments, a "user" may be represented as a single individual. However, other embodiments of the disclosure encompass a "user" being an entity controlled by a set of users and/or an automated source. For example, a set of individual users federated as one or more departments in an organization may be considered a "user." In general, functions described in one embodiment as being performed by the communication services platform 120 can also be performed on the client devices 110A through 110Z in other embodiments (and vice versa), if appropriate. In addition, the functionality attributed to a particular component can be performed by different or multiple components operating together. The communication services platform 120 can also be accessed as a service provided to other systems or devices through appropriate APIs.

As noted above and in some embodiments, a communication channel can refer to an entity, such as a third-party entity (e.g., organizations different from communication services platform 120), that offers services, software or hardware (or a combination thereof) through which messages can be sent to recipient devices. (e.g., organizations different from communication services platform 120). A third party can refer to an entity, such as organization or business (e.g., a different legal entity than communication services platform 120) that is distinct from another entity, such as the entity controlling or owning the communication services platform 120. In some embodiments, the communication services offered by communication channels 114A-114Z can be integrated into communication services platform 120. In some embodiments, the communication services offered by communication channels 114A-114Z can include messaging services. In some embodiments, messaging services can include one or more of a short messaging service (SMS) offered by an SMS channel, a multimedia messaging service (MMS) offered by an MMS channel, or an instant messaging service (e.g., chat messaging) offered by an instant messaging service channel. In some embodiments, communication channels 114A-114Z can also include a voice channel. For example, the voice channel may implement an application to send or receive calls. In another example, the voice channel may include a telecommunication service provider and/or PSTN voice services.

In some embodiments, an instant messaging service is different from an electronic mail (email) service. In some embodiments, the communication channels 114A-114Z can include an email channel. In some embodiments, the communication channels 114A-114Z exclude an email channel. In some embodiments, email messages can use a standard protocol for sending and receiving email messages. The standard protocol can be used across different platforms. In some embodiments, instant messages can use protocols specific to a platform that may or may not be compatible with other platforms. In some embodiments, instant messaging can differ from email in that conversations over instant messaging can happen in real-time, while conversations over email are not in real-time.

In another illustrative example, client device 110Z may want transfer an existing voice call to another client device, such as client device 110A. In some embodiments, communication services platform 120 and/or client devices 110 include an instance of voice call transfer module 151. In some embodiments, voice call transfer module 151 of client device 110Z, of communication services platform 120, or a combination thereof can perform one or more aspects of the disclosure.

In some embodiments, an entity (e.g., organization) can be associated with an account (e.g., organizational account) of communication services platform 120. Within the particular account (e.g., organizational account) of the organization, one or more user accounts of the communication services platform 120 may be associated with different users of the organization. In some embodiments, the accounts are organized in a hierarchical structure where the organizational account is the root at the top of the hierarchy and the user accounts are nested under the organizational account.

In some embodiments, communication services platform 120 can provision telephone numbers (e.g., 10-digit long code or short code) to an organization's account and assign the telephone numbers to various user accounts associated with the organization. The assignment of telephone numbers can be flexible such that the assignment of a telephone number can be one to one (e.g., one telephone number to one user account) or one to many (e.g., one telephone number to many user accounts).

In some embodiments, communication services platform 120 can dynamically assign or transfer the telephone numbers. For example, user account A may be assigned telephone number A. Telephone number A can be transferred and assigned to another user account Z and unassigned from user account A, or can be assigned to user account Z and user account A, for instance.

In some embodiments, voice calls and messages can be dynamically routed or sent to and from different telephone numbers. For instance, a user account A may be assigned telephone number A. Telephone number A may have an area code corresponding to Texas. User account A, via application 154 of client device 110A, sends, via communication services platform 120, a message A to an end user device. The end user device can be associated with a telephone number with an area code associated with the state of California. Communication services platform 120 can associate a telephone number with a California area code to the message conversation and send message A to end user device from the associated telephone number with a California area code. From the perspective of the end user device, the message A can appear to be sent from the telephone number with a California area code, rather than from the telephone number A with a Texas area code.

In some embodiments, the telephone number of the client device 110 (e.g., telephone number assigned to the client device 110 by the telecommunications carrier) can be different than the telephone number that is assigned to the user account associated with the client device 110. In some embodiments, the client device 110 may not have a telephone number assigned by a telecommunications carrier. For instance, the client device 110A may be a desktop computer. In some embodiments, the client device 110A can be identified by an internet protocol (IP) address and can send messages of the message conversation using a protocol such as HTTP over TCP/IP (transmission control protocol) or can place a voice call using a Voice over IP (VoIP) protocol (e.g. SIP) via application 154, for example.

Although embodiments of the disclosure are discussed in terms of communication service platforms, embodiments may also be generally applied to any type of platform, system or service.

In situations in which the systems discussed here collect personal information about users, or may make use of personal information, the users may be provided with an opportunity to control whether the communication services platform 120 collects user information, or to control whether and/or how to receive content from the communication services platform 120 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the communication services platform 120.

Figure 2:
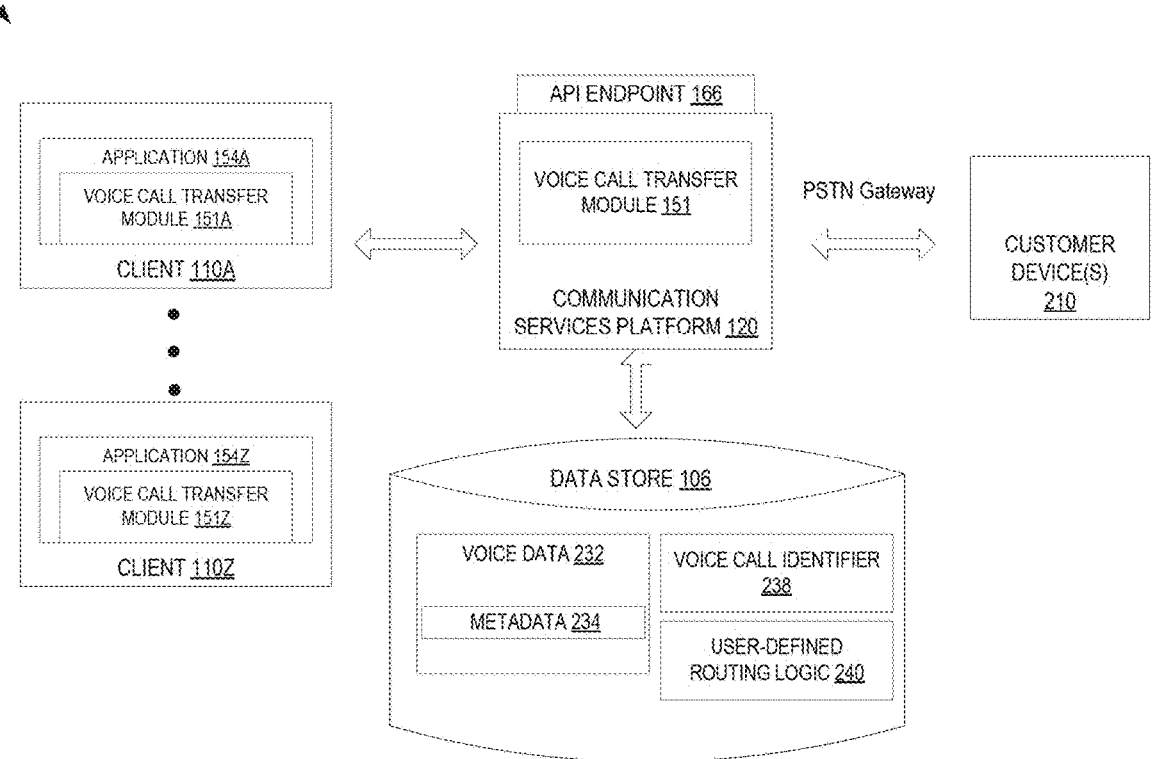
FIG. 2 illustrates an example system architecture used for voice calls, in accordance with some embodiments of the disclosure.

FIG. 2 illustrates an example system architecture 200 used for voice calls, in accordance with some embodiments of the disclosure. Components of FIG. 1 are used to help describe aspects of FIG. 2. The system architecture 200 (also referred to as "system" herein) includes a communication services platform 120, a data store 106, one or more client devices 110A through 110Z, and one or more customer devices 210 (also referred to as "end user devices" herein). Customer devices 210 can be similar to client devices 110A-110Z or client devices 112A-112Z, as described with respect to FIG. 1.

As illustrated, client devices 110 can communicate with communication services platform 120 using application 154. In some embodiments, instances of application 154 are provided by communication services platform 120 to client device 110A through 110Z to facilitate messaging conversations and/or voice calls between one or more of client device 110 and customer devices 210. It can be noted that application 154A through 154Z are generally referred to as application(s) 154.

In an illustrative example, users of client devices 110 can be part of an organization that uses one or more communication services provided by communication services platform 120. The users of the client devices 110 can each be assigned a user account (e.g., unique user account) that is associated with the organization and that allows access to the communication services provided by communication services platform 120. The organization may use the communication services platform 120 to facilitate messaging conversations and/or voice calls with customers (e.g., customers of the organization, rather than the communication services platform 120 and represented by customer device 210). For instance, client device 110A, via application 154, can conduct a text messaging conversation and/or a voice call with a customer (e.g., customer device 210). Customer can also be referred to as "end user" herein.

In some embodiments, application 154A through 154Z can be instances of the same application. In some embodiments, application 154A through application 154Z can be different applications. For example, application 154A can be a web-based application and application 154Z can be a mobile application.

For example and in some embodiments, client device 110A can be a desktop device and/or a client device that implements a web-based application (e.g., application 154A). A web-based application can be platform-independent and run on different operating systems (OS). For example, a web-based application can include a web browser. In some embodiments, client device 110Z can be a mobile device and/or a client device that implements a mobile application (e.g., application 154Z), such as a native application. In some embodiments, the web-based application can implement a first set of API calls compatible with a web-based application. In some embodiments, the mobile application can implement a second set of API calls compatible with a mobile application. In some embodiments, the first set of API calls and the second set of API calls are different API calls. In other embodiments, client device 110A and client device 110Z are the same or different type of client device.

Similarly in some embodiments, voice call transfer module 151A and voice call transfer module 151Z (generally referred to as "voice call transfer module 151" herein) can be instances of the same module. In some embodiments, voice call transfer module 151A and voice call transfer module 151Z can be different modules. For example, voice call transfer module 151A can be for a web-based application and voice call transfer module 151Z can be for a mobile application.

As described above, a user of client device 110A (associated with user account A) using application 154 may be participating in a voice call with a customer associated with customer device 210. The user of client device 110A may want to transfer the voice call to another client device 110Z. For example, the user of client device 110A may have received the voice call at a desktop device (e.g., client device 110A) and would like to transfer the voice call to a mobile device (e.g., client device 110Z). To such end, the user of client device 110A may initiate a transfer of the voice call to client device 110Z via application 154 of client device 110A or client device 110Z. The transfer of a voice call is further described with respect to FIG. 3.

In some embodiments, data store 106 can include voice data 232. Voice data 232 can include any data related to the voice calls including but not limited to transcription records, background music, message prompts and so forth.

In some embodiments, the voice data 232 can include metadata 234 associated with the one or more voice calls. Metadata 234 associated with voice call(s) can include metadata associated with the voice calls generally and/or metadata associated with a particular voice call of a voice conversation. For example, the metadata 234 can include the names of the participants of the voice call, the telephone numbers of the devices used in the voice call, time and date information corresponding to the voice call (e.g., start time stamp and end time stamp), information identifying any actions taken during the voice call (e.g., transfer the voice call). In some embodiments, the metadata 234 can include an identifier of a destination endpoint of a voice call (e.g., a recipient's device (e.g., client device 110A and/or client device 110B) telephone number or IP address, etc.). In some embodiments, the metadata 234 can include an identifier of an origin start point (also referred to "start point identifier" herein) of a voice call (e.g., a customer's carrier telephone number or IP address). In some embodiments, the metadata 234 can include account identifiers associated with the voice call, such as an organizational account and one or more user accounts participating in the voice call. In some embodiments, the metadata 234 can include an identifier of the communication services platform 120, such as a URL that identifies the communication services platform 120 or a service thereof.

In some embodiments, the metadata 234 can include the usernames of one or more of the participants of the voice call. In some embodiments, the metadata 234 can include the time and date the voice call was established.

In some embodiments, each voice call and/or the associated metadata can be associated with a voice call identifier 238. In some embodiments, the voice call identifier 238 can include a unique identifier that is specific to the particular voice call and the associated metadata. In some embodiments, the voice call identifier 238 can be used an entry of a record, such as a look up table, such that the voice call identifier 238 can be used to identify corresponding voice data 232 and/or associated metadata 234.

In some embodiments, data store 106 can include user-defined routing logic 240. User-defined routing logic 240 can be configurable by a user and can include instructions or rules indicating the particular communication services (e.g., voice call services and/or message conversation services) to invoke before, during or after a voice call or message conversation. For example, the user-defined routing logic 240 can include instructions to transcribe a call, to implement IVR during a particular part of the call, or invoke a voice message during another part of the call (e.g., "Welcome"). In some embodiments, the user-define routing logic 240 may be defined by an administrator having a user account with permission to define the user-defined routing logic on behalf of the corresponding organization.

In some embodiments, user-defined routing logic 240 can include instructions indicating how a voice call is to be routed. For example, the user-defined routing logic 240 can instruct communication services platform 120 to route an inbound call (e.g., call from customer device 210 to a recipient telephone number associated with an organizational account) to any available user account (e.g., agent account) associated with the particular organization that is associated with the recipient telephone number. In another example, the user-defined routing logic 240 can include instructions as to which specific user account(s) an inbound call is to be routed.

In some embodiments, user-defined routing logic 240 is configurable by users via APIs made available by communication services platform 120. In some embodiments, the user-defined routing logic 240 can be retrieved from a server (e.g., third-party client server) and stored at communication services platform 120.

In some embodiments, voice calls between a client device 110 and customer device 210 are conducted via communication services platform 120. For example, the client device 110Z can be a mobile phone that has a telephone number assigned by the carrier (e.g., carrier telephone number Z). Additionally, the user account associated with client device 110Z (e.g., via a login to application 154 installed at client device 110Z) may be assigned a different telephone number that is provisioned by communication services platform 120 (e.g., provisioned telephone number Z). In some embodiments, client device 110A can be a desktop device that associated with the same user account as client device 110Z (or in some instances a different user account).

In some embodiments, customer device 210 can initiate a voice call (e.g., inbound voice call) to a recipient telephone number associated with and assigned by communication services platform 120. The customer may initiate the voice call using the customer device 210 that is assigned a telephone number (e.g., caller telephone number) from a carrier. The voice call can be connected between the customer device 210 and the communication services platform 120 using a PSTN gateway. For instance, the voice call from the customer device 210 can be, at least in part, over a PSTN, and converted at the PSTN gateway to VoIP. The PSTN gateway can be a third-party PSTN gateway or part of communication services platform 120, in some embodiments. The communication services platform 120 can receive the voice call (e.g., connect to) from customer device 210 as a VoIP call. It can be noted that customer device 210 may also use VoIP to initiate the voice call in some embodiments.

It can be noted that in other embodiments, the user of client device 110 can initiate a voice call to customer device 210 (e.g., outbound voice call). For example, client device 110A can initiate the voice call by dialing the telephone number of the customer device 210. The voice call can be initially routed to communication services platform 120 using VoIP. The communication services platform 120 can route the voice call to the customer device 210 where the VoIP call is converted at a PSTN gateway in a format suitable for a PSTN network and connected with the customer device 210 to establish the voice call between the client device 110A and customer device 210. In some embodiments it can be noted that at some part of the voice call (e.g., inbound or outbound voice call) a PSTN gateway is used to interface between an IP-based VoIP network and a circuit-switched PSTN network.

In some embodiments, after receiving the voice call, the communication services platform 120 can use the recipient telephone number to identify the organization to which the recipient telephone number is assigned. In some embodiments, the communication services platform 120 can identify the user-defined routing logic 240 that is assigned to one or more of the recipient telephone number or organization. In some embodiments, the user-defined routing logic 240 can identify how the voice call to the recipient telephone number is to be routed. For example, a call center may include multiple agents answering customer voice calls. The user-defined routing logic 240 may indicate that a voice call to the particular recipient telephone number can be assigned to an agent or all agent(s) (e.g., user accounts) that is/are currently available (e.g., status as active and not engaged on another voice call). Responsive to identifying an available agent(s), the communication services platform 120 can connect the voice call between the client device 110A and communication services platform 120 using VoIP to establish the voice call between the client device 110A and customer device 210.

In some embodiments, the user of client device 110A may wish to transfer the call to another client device, such as client device 110Z. For example, client device 110A may be a desktop device and the user may wish to transfer the call to their mobile device (e.g., client device 110Z) so that the user can walk the warehouse while discussing the customer service issue with the customer. Client device 110A and 110Z may both have application 154 installed and the user may be logged into their user account at both client device 110A and 110Z.

In some embodiments, the user using client device 110A or client device 110Z can initiate the transfer of the voice call to client device 110Z. For example, an agent can access client device 110Z (e.g., mobile device) and activate application 154. Client device 110Z can receive information (e.g., transfer information) identifying active voice calls. Transfer information can refer to information related to the transfer of a voice call. For instance, the GUI of application 154 can have one or more GUI elements that display active calls associated with the user account. The user can select the GUI element to connect the client device 110Z to the voice call. Connection to the voice call using client device 110Z can be similar as described above.

In some embodiments, subsequent to establishing the voice call between client device 110Z and customer device 210, the voice call can be a conference call for at least some part of the voice call. A conference call can refer to a call (e.g., voice call, video call, etc.) that includes three or more user devices (e.g., client device(s) and/or customer device (s)) connected to the call. For example and in some embodiments, after establishing the voice call between the client device 110Z and customer device 210, the voice call connection between client device 110A and customer device 210 is maintained but the audio is muted by communication services platform 120. It can be noted that the transfer of the voice call can be initiated in different ways and will be described in more detail with respect to FIG. 3.

In some embodiments, one or more of client device 110A and client device 110Z can be designated by the communication services platform 120 as a host device. A host device is permitted by the communication services platform 120 to end the voice call with the customer device 210. In some embodiments, a non-host device is not permitted by communication services platform 120 to end the voice call with the customer device 210.

For example, client device 110Z (unmuted) and client device 110A (muted) and customer device 210 can be connected to the voice call. Client device 110Z can be designated as the host device of the voice call (e.g., conference call) and client device 110A can be designated as a non-host device. If client device 110Z disconnects from the voice call, the voice call connection between client device 110A and customer device 210 is also ended. If the client device 110Z disconnects from the voice call, the voice call connection between client device 110Z and customer device 210 is maintained.

In another example, client device 110Z and 110A can both be designated as the host devices of the voice call. In such a scenario, if either one of client device 110Z and 110A disconnects from the voice call the voice call is maintained with the other of client device 110Z or client device 110A and customer device 210.

As described herein in some embodiments, the transfer of the voice call is from a desktop device to a mobile device. In other embodiments, the transfer of the voice call is from a mobile device to a desktop device, between mobile devices, or between desktop devices.

Figure 3:
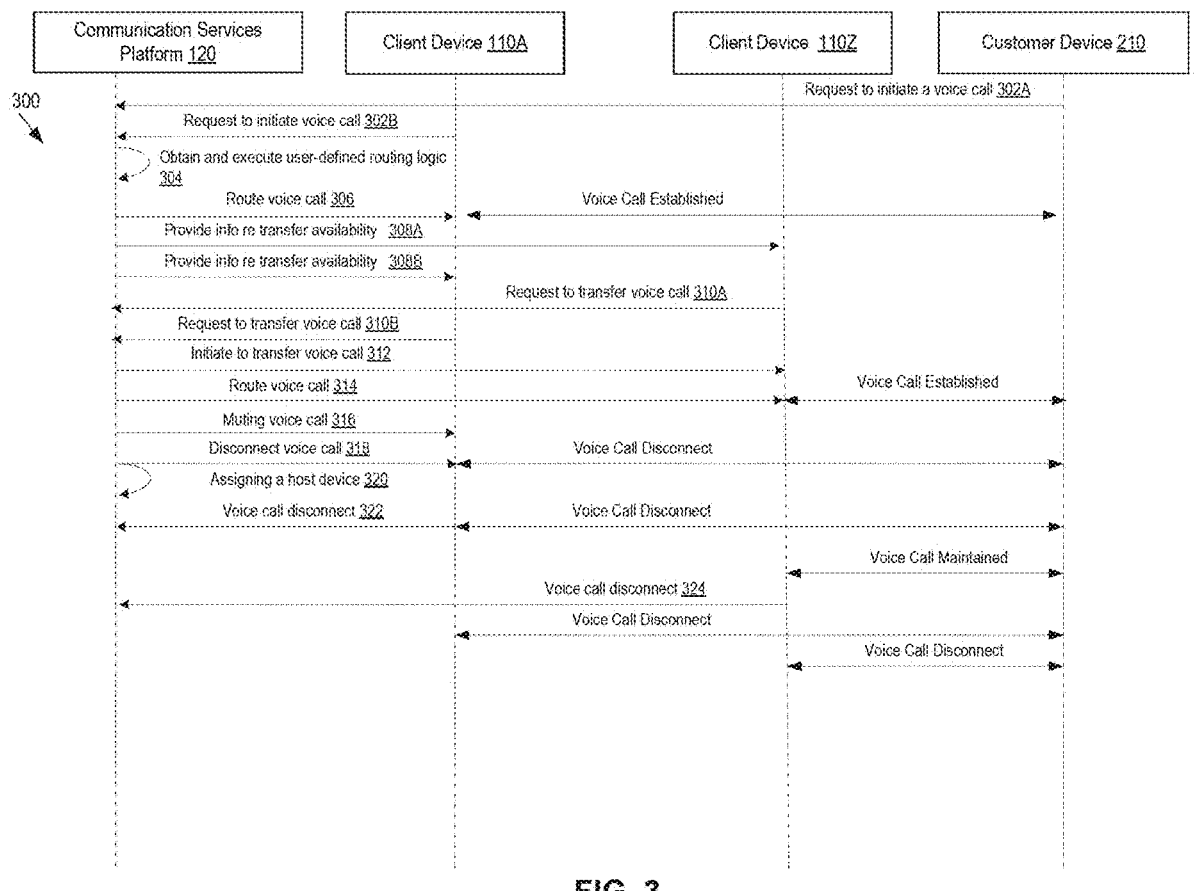
FIG. 3 illustrates a sequence diagram of establishing a voice call and transferring the voice call among client devices of communication services platform, in accordance with embodiments of the disclosure.

Elements of FIG. 1 and FIG. 2 are used with respect to FIG. 3 to help describe features of diagram 300. The operations described with respect to FIG. 3 are shown to be performed serially for the sake of illustration, rather than limitation. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed.

FIG. 3 illustrates a sequence diagram of establishing a voice call and transferring the voice call among client devices of communication services platform, in accordance with embodiments of the disclosure.

Diagram 300 illustrates communication services platform 120, client device 110A, client device 110Z, and customer device 210. In some embodiments, one or more of communication services platform 120, client device 110A using application 154, client device 110Z using application 154, and in particular voice call transfer module 151 thereon can implement the operations depicted in diagram 300.

In some embodiments, client device 110A using client account A and/or client device 110Z using client account A conducts a voice call with customer device 210. For the sake of illustration, rather than limitation, the following description describes the user account of client device 110A and client device 110Z as the same user account. In other embodiments, client device A using client account A and/or client device 110Z using client account Z (that is different than client account A) conducts a voice call with customer device 210.

In some embodiments and as noted above, client device 110A can be a desktop device and/or a client device that implements a web-based application (e.g., application 154A). In some embodiments, client device 110Z can be a mobile device and/or a client device that implements a mobile application (e.g., application 154Z).

In some embodiments, the operations described with respect to FIG. 3 between client device(s) 110 and communication services platform 120 can be performed using an API. For the sake of brevity, the below operations between client device(s) and communication services platform 120 can be performed via API calls, unless otherwise described.

In some embodiments, method 300 illustrates different combinations of operations that can be implemented to transfer a voice call in different manners. For example and in some embodiments, a voice call can be established between client device 110A (e.g., desktop device) and customer device 210. Using client device 110A, a user can initiate a transfer of the voice call to another client device 110Z (e.g., mobile device). The communication services platform 120 can send information (e.g., transfer information) to the client device 110Z. The user can open application 154Z of client device 110Z and the application can populate the GUI of application 145Z to include a GUI element that indicates that a transfer of the voice call is available. The user can select the GUI element. Responsive to the selection of the GUI element, a request to join the voice call to the client device 110Z can be sent to communication services platform 120, and communication services platform 120 joins client device 110Z to the voice call (and in some cases, without initiating an inbound call to client device 110Z). In some embodiments, client device 110A can receive a notification that client device 110Z will join the voice call. In some embodiments, the client device 110A is muted once client device 110Z joins the call.

In another example and in some embodiments, a voice call can be established between client device 110A (e.g., desktop device) and customer device 210. The user, via client device 110A, can initiate a transfer of a voice call to client device 110Z. For instance, the user can select a GUI element (e.g., "transfer to mobile"). Responsive to selecting the GUI element, an API call be sent to communication services platform 120 requesting client device 110Z to join the voice call. Communication services platform 120 can place an inbound call (e.g., with a notification such as a message and/or ringtone) to client device 110Z.

In another example and in some embodiments, a voice call can be established between client device 110A (e.g., desktop device) and customer device 210. The user of client device 110A can open application 154Z of client device 110Z, which can be automatically populated with transfer information received from communication services platform 120. The user can select the GUI element of the GUI of application 154Z. Responsive to the selection of the GUI element, communication services platform 120 can join client device 110Z to the voice call (and in some cases, without communication services platform 120 initiating an inbound call to client device 110Z).

At operation 302A, customer device 210 initiates a voice call (e.g., inbound voice call) to a recipient telephone number associated with communication services platform 120 (e.g., assigned by communication services platform 120 to an organization). Initiating a voice call by customer device 210 is further described above with respect to FIG. 2.

At operation 302B, a client device, such as client device 110A initiates a voice call (e.g., outbound voice call) to a telephone number associated with customer device 210, in accordance with some alternative embodiments. For example, client device 110A can initiate a VoIP voice call to the telephone number associated with the customer device 210. The VoIP voice call can be received by a PSTN gateway to format the VoIP voice call in a format compatible with the PSTN network.

At operation 304, communication services platform 120 obtains and executes user-defined routing logic, such as user-defined routing logic 240 as described with respect to FIG. 2. In some embodiments, the telephone number (e.g., recipient telephone number with respect to operation 302A, the caller telephone number or other identifier with respect to operation 302B) can be assigned by communication services platform 120. The telephone number can be associated with an organizational account and/or user account. The organizational account can be associated with user-defined routing logic. The telephone number and/or organizational account can be used as a reference identifier to obtain the corresponding user-defined routing logic from a data store.

In some embodiments, the user-defined routing logic can be executed for the particular voice call. For example, the user-defined routing logic can define what actions to take before, during and after a voice call (e.g., prompt user for particular information, use a particular greeting, etc.). In another example as described above, the user-defined routing logic can define how the voice call is to be routed. For instance, the user-defined routing logic can specify that an inbound voice call to the particular telephone number is to be routed to a subset of agents, among multiple agents, that are active and available to participate in a voice call.

In some embodiments, communication services platform 120 can identify, among a group of user accounts associated with the organizational account, a user account to which the voice call is to be routed based on the user-defined routing logic.

At operation 306, communication services platform 120 routes the voice call to the client device 110A. In some embodiments, communication services platform 120 routes the voice call to client device 110A pursuant to the user-defined routing logic. Once the connection between the communication services platform 120 and client device 110A is routed and connected (e.g., the recipient user answers), communication services platform 120 can establish the voice call between customer device 210 and client device 110A.

In some embodiments, a connection of the voice call between communication services platform 120 and the customer device 210 uses a PSTN network. In some embodiments, the connection of the voice call between the communication services platform 120 and client device 110A uses VoIP over a network.

At operation 308A, communication services platform 120 provides to client device 110Z information (e.g., transfer information) indicating that client device 110Z (or any other client device(s)) is available to receive a transfer of the voice call. As noted above, transfer information can refer to information related to the transfer of a voice call. For instance, the transfer information can identify an active voice call, which user account(s)/client device(s) are available to receive the transfer of a voice call, and/or include information to generate a GUI element that, upon selection, initiates a transfer of a voice call.

In some embodiments, the transfer information can be provided to client device 110Z without a user-submitted request from client device 110Z (e.g., selection of a GUI element) of client device 110A requesting whether a transfer of the voice call is available. For example, the conversations system 122 can determine whether application 154Z is opened (e.g., phone is powered and/or unlocked) and/or the user is signed into the user account (e.g., authenticated). If communication services platform 120 determines that application 154Z is opened and/or the user is signed into the user account (e.g., user account Z), communication services platform 120 can push the transfer information to client device 110Z.

For instance, responsive to unlocking client device 110Z, communication services platform 120 can send transfer information to client device 110Z. Application 154Z of client device 110Z can display the transfer information as a GUI element within the GUI of application 154Z. The GUI element can be made available for selection. Responsive to selection of the GUI element, the client device 110Z can send a request to communication services platform 120 to transfer the voice call with customer device 210 to client device 110Z.

In some embodiments, the transfer information can be provided to client device 110Z responsive to a user-submitted request from client device 110Z (e.g., selection of a GUI element) or client device 110A requesting whether a transfer of the voice call is available. For example, the user of client device 110Z can select a GUI element (e.g., update available voice transfers) the initiates a request for transfer information be sent to communication services platform 120. Communication services platform 120 can identify the transfer information and send the transfer information to client device 110Z responsive to the request.

At operation 308B, communication services platform 120 can send transfer information to client device 110A, in accordance with some embodiments. In some embodiments, the transfer information can be provided to client device 110A without a user-submitted request from client device 110A (e.g., selection of a GUI element) or client device 110Z requesting whether a transfer of the voice call is available. In some embodiments, the transfer information can be provided to client device 110A responsive to a user-submitted request from client device 110A (e.g., selection of a GUI element) or client device 110Z requesting whether a transfer of the voice call is available. The description of operation 308A can apply to operation 308B and is not repeated here for the sake of brevity.

At operation 310A, client device 110Z sends a request (e.g., via API) to transfer the voice call with the customer device 210 from client device 110A associated with user account A to client device 110Z associated with user account A. For example, the transfer information can be displayed as a GUI element at application 154Z of client device 110Z (e.g., a GUI element displaying "transfer voice call"). Responsive to selection of the GUI element, the client device 110Z can send an API call to communication services platform 120 requesting the transfer of the voice call to client device 110Z. It can be noted that in some embodiments, selection of the GUI element can initiate a transfer of the voice call to client device 110Z without initiating an inbound call. Rather, the client device 110Z can be joined with the call via application 154Z using VoIP via a network (e.g., the voice call can be routed to client device 110Z as illustrated in operation 314).

At operation 310B, client device 110A sends a request (e.g., via an API call) to transfer the voice call with the customer device 210 to client device 110Z associated with user account A. For example, communication services platform 120 has established a voice call between client device 110A (e.g., desktop) and customer device 210. To transfer the voice call to the mobile device (e.g., client device 110Z), the user selects a GUI element (e.g., transfer information) on application 154A of client device 110A to transfer the call to client device 110Z. In some embodiments, responsive to the selection of the GUI element on application 154A of client device 110A to transfer the voice call to client device 110Z, communication services platform 120 can place an inbound call to client device 110Z and noted in operation 312.

In some embodiments at operation 310B, client device 110A sends a request to transfer the voice call with customer device to client device 110Z. Responsive to the request, communication services platform 120 can send the transfer information to client device 110Z (e.g., operation 308A). To initiate the transfer of the voice call, the user can select the GUI element reflecting the transfer information, and client device 110Z can be joined to the voice call (e.g., the voice call can be routed to client device 110Z as illustrated at operation 314). In some embodiments, communication services platform 120 does not initiate an inbound call to client device 110Z when the GUI element reflecting the transfer information is selected at client device 110Z.

At operation 312, communication services platform 120 initiates a transfer of a voice call to client device 110Z. In some embodiments operation 312 is performed responsive to the performance of operation 310B. For example, client device 110A requests a voice call between client device 110A and customer device 210 to be transferred to client device 110Z. Client device 110Z may be in a sleep mode and/or locked. To initiate the voice call, communication services platform 120 can initiate an inbound call to client device 110Z (e.g., send a notification to application 154Z via WiFi or cellular data) such that the client device 110Z receives an incoming call notification via application 154Z. If the user selects the incoming call, the voice call is routed to client device 110Z (e.g., operation 314).

At operation 314, the voice call is routed to client device 110Z and the voice call is established between client device 110Z and customer device 210, via communication services platform 120.

At operation 316, communication services platform 120 mutes the voice call between client device 110A and customer device 210. In some embodiment, the voice call is automatically muted for client device 110A. In some embodiments, the voice call for client device 110A is automatically muted responsive to establishing the voice call between client device 110Z and customer device 210. In some embodiments, if client device 110A and client device 110Z are associated with the same user account, the voice call is automatically muted for client device 110A. In some embodiments, if client device 110A and client device 110Z are not associated with the same user account, the voice call is not automatically muted for client device 110A.

At operation 318, communication services platform 120 can disconnect client device 110A from the voice call. In some embodiments, responsive to establishing the voice call between client device 110Z and customer device 210, communication services platform 120 can disconnect the voice call between client device 110A and customer device 210. In some embodiments, the voice call can between client device 110A and customer device 210 can be automatically disconnected responsive to establishing the voice call between client device 110Z and customer device 210. In some embodiments, client device 110A can initiate the disconnect from the voice call (e.g., close the application or select a disconnect call GUI element, for example).

At operation 320, communication services platform 120 can assigned one or more of client device 110A and/or client device 110Z as host device of the voice call. In some embodiments, communication services platform 120 can automatically or programmatically (e.g., responsive to logic) assign one or more of client device 110A and/or client device 110A as the host device. In some embodiments, one or more of client device 110A and/or client device 110Z can select a GUI element indicating that either client device 110A or client device 110Z is to be assigned the host device. Communication services platform 120 can assign the host device pursuant to the user selection. In some embodiments, the assignment of host device can be based on user preferences or organizational preferences.

At operation 322, client device 110A sends a request to communication services platform 120 to disconnect from the voice call, responsive to which client device 110A is disconnected from the voice call. In some embodiments, client device 110Z is assigned as host device and the voice call between client device 110Z and customer device 210 is maintained by communication services platform 120.

At operation 324, client device 110Z sends a request to communication services platform 120 to disconnect from the voice call. In some embodiments where client device 110Z is assigned as the host device, client device 110Z is disconnected from the voice call responsive to the request. In some embodiments and since client device 110Z is the host device (and not client device 110A) the voice call between client device 110A and customer device 210 is also disconnected responsive to the request from client device 110Z to disconnect the voice call.

Figure 4:
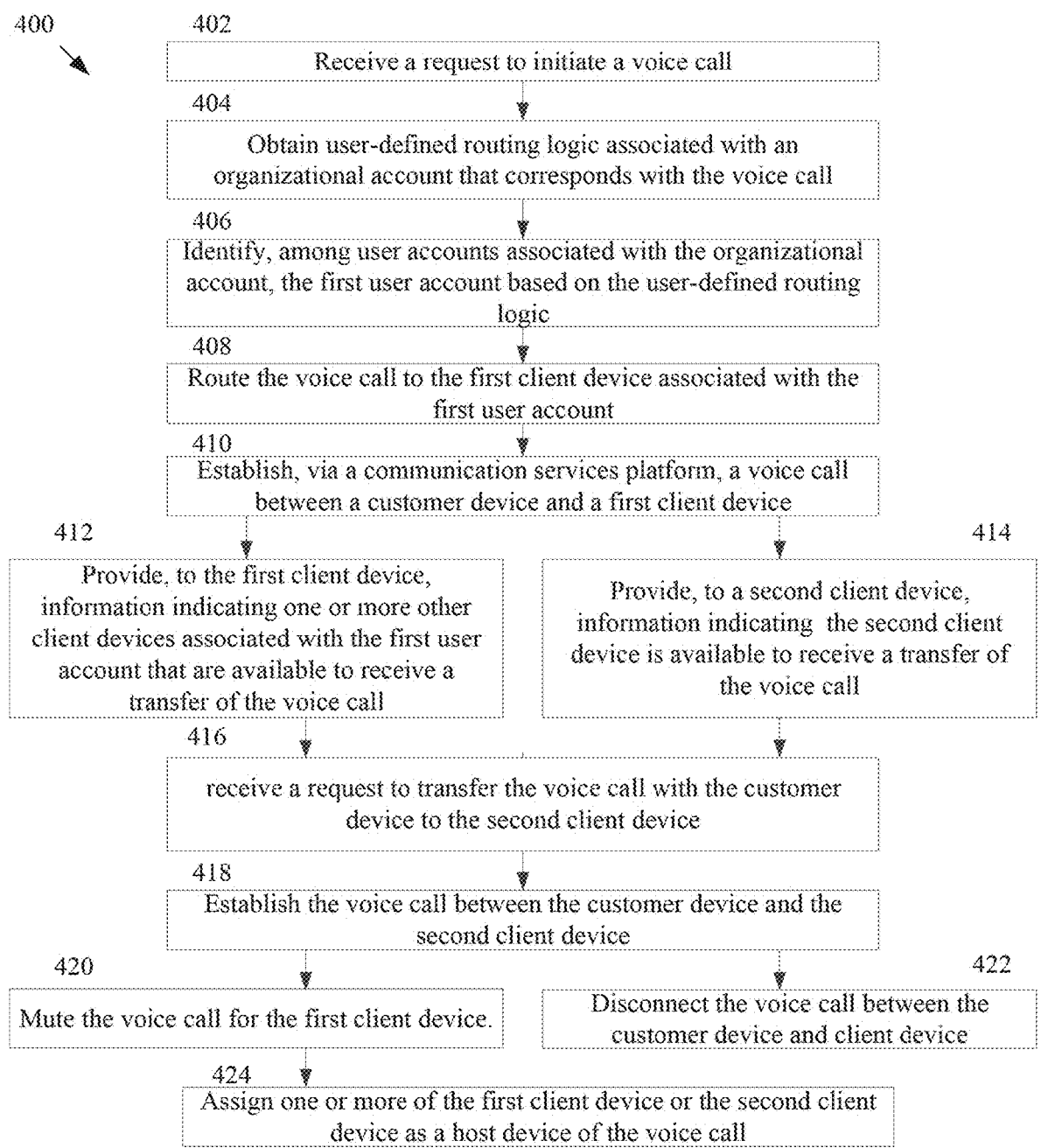
FIG. 4 depicts a flow diagram of an example method for transferring a voice call, in accordance with some embodiments of the disclosure.

Method 400 of FIG. 4 and/or each of the aforementioned method's individual functions, routines, subroutines, or operations can be performed by a processing device, having one or more processing units (CPU) and memory devices communicatively coupled to the CPU(s). In some embodiments, the method 400 can be performed by a single processing thread or alternatively by two or more processing threads, each thread executing one or more individual functions, routines, subroutines, or operations of the method. Method 400 as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 400 is performed by voice call transfer module 151 described in FIGS. 1 and 2. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. It may be noted that elements of FIG. 1-3 may be used herein to help describe FIG. 4.

FIG. 4 depicts a flow diagram of an example method 400 for transferring a voice call, in accordance with some embodiments of the disclosure. In some embodiments, method 400 can be performed by communication services platform 120, and in particular voice call transfer module 151 of communication services platform 120.

At operation 402, processing logic receives a request to initiate a voice call. In some embodiments, processing logic receives, from the customer device, a request to initiate the voice call. In some embodiments, the request identifies a recipient telephone number.

At operation 404, processing logic obtains user-defined routing logic associated with an organizational account that corresponds with the voice call. In some embodiments, processing logic obtains user-defined routing logic associated with an organizational account that corresponds with the recipient telephone number.

At operation 406, processing logic identifies, among user accounts associated with the organizational account, the first user account based on the user-defined routing logic.

At operation 408, processing logic routes the voice call to the first client device associated with the first user account. For example, the communication services platform 120 can send a notification (e.g., message and/or ringtone). At operation 410, processing logic establishes, via the communication services platform, a voice call between a customer device and a first client device.

For example, the user of the first client device can accept the call (e.g., accept the notification) and communication services platform can establish the call. In some embodiments, the first client device is associated with a first user account of the communication services platform. Subsequent to operation 410, processing logic can proceed to one or more of operation 412 and/or operation 414.

In some embodiments, to establish, via the communication services platform, the voice call between the customer device and the first client device, processing logic establishes a first connection of the voice call between the customer device and communication services platform using a public switched telephone network (PSTN). In some embodiments, processing logic, establishes a second connection of the voice call between the communication services platform and first client device using a voice over internet protocol (VoIP) over a network (e.g., Internet).

In some embodiments, the first client device is a desktop device implementing a web-based application. In some embodiments, the second client device is a mobile device implementing a mobile application. In some embodiments, a first set of API calls used for communication between the web-based application and the communication services platform is different from a second set of API calls used for communication between the mobile application and the communication services platform.

At operation 412, processing logic provides, to the first client device, information (e.g., transfer information) indicating one or more other client devices associated with the first user account that are available to receive a transfer of the voice call.

At operation 414, processing logic provides, to a second client device, information indicating the second client device is available to receive a transfer of the voice call.

At operation 416, processing logic receives a request to transfer the voice call with the customer device to the second client device. In some embodiments, processing logic receives, via an application programming interface (API) call, a request to transfer the voice call with the customer device to a second client device associated with the first user account. As noted herein, the request to transfer the voice call can be initiated by the first client device (as reflected in operation 412) or the second client device (as reflected in operation 414). It can also be noted that in some embodiments, the transfer of the voice call is between client devices associated with the same user account. In other embodiments, the transfer of the voice call can be between client devices associated with different user accounts.

In some embodiments, to receive, via the API call, the first request to transfer the voice call to the second client device associated with the first user account, processing logic subsequent to providing, to the first client device, the information indicating the one or more client devices associated with first user account are available to receive the transfer of the voice call (e.g., operation 412), receives, from the first client device, the first request to transfer the voice call to the second client device. In some embodiments, processing logic can send, to the second client device, a third request to establish the voice call between the customer device and the second client device. For example, communication services platform 120 can send a notification and/or transfer information to the second client device.

In some embodiments, to receive, via the API call, the first request to transfer the voice call to the second client device associated with the first user account, processing logic subsequent to providing the information indicating the second client device is available to receive the transfer of the voice call (e.g., operation 414), receives, from the second client device via the API call, the first request to transfer the voice call to the second client device.

At operation 418, processing logic establishes the voice call between the customer device and the second client device. In some embodiments, responsive to receiving the first request to transfer the voice call, processing logic establishes, via the communication services platform, the voice call between the customer device and the second client device associated with the first user account.

In some embodiments, processing logic can proceed to one or both of operation 420 and 422 subsequent operation 418.

At operation 420, processing logic mutes the voice call for the first client device. In some embodiments, muting the voice call for the first client device is performed subsequent to establishing, via the communication services platform, the voice call between the customer device and the second client device associated with the first user account.

At operation 422, processing logic disconnects the voice call between the customer device and the first client device. In some embodiments, disconnecting the voice call between the customer device and first client device is performed subsequent to establishing, via the communication services platform, the voice call between the customer device and the second client device associated with the first user account.

At operation 424, processing logic assigns one or more of the first client device or the second client device as a host device of the voice call. In some embodiments, the host device permitted to end the voice call with the customer device.

Figure 5:
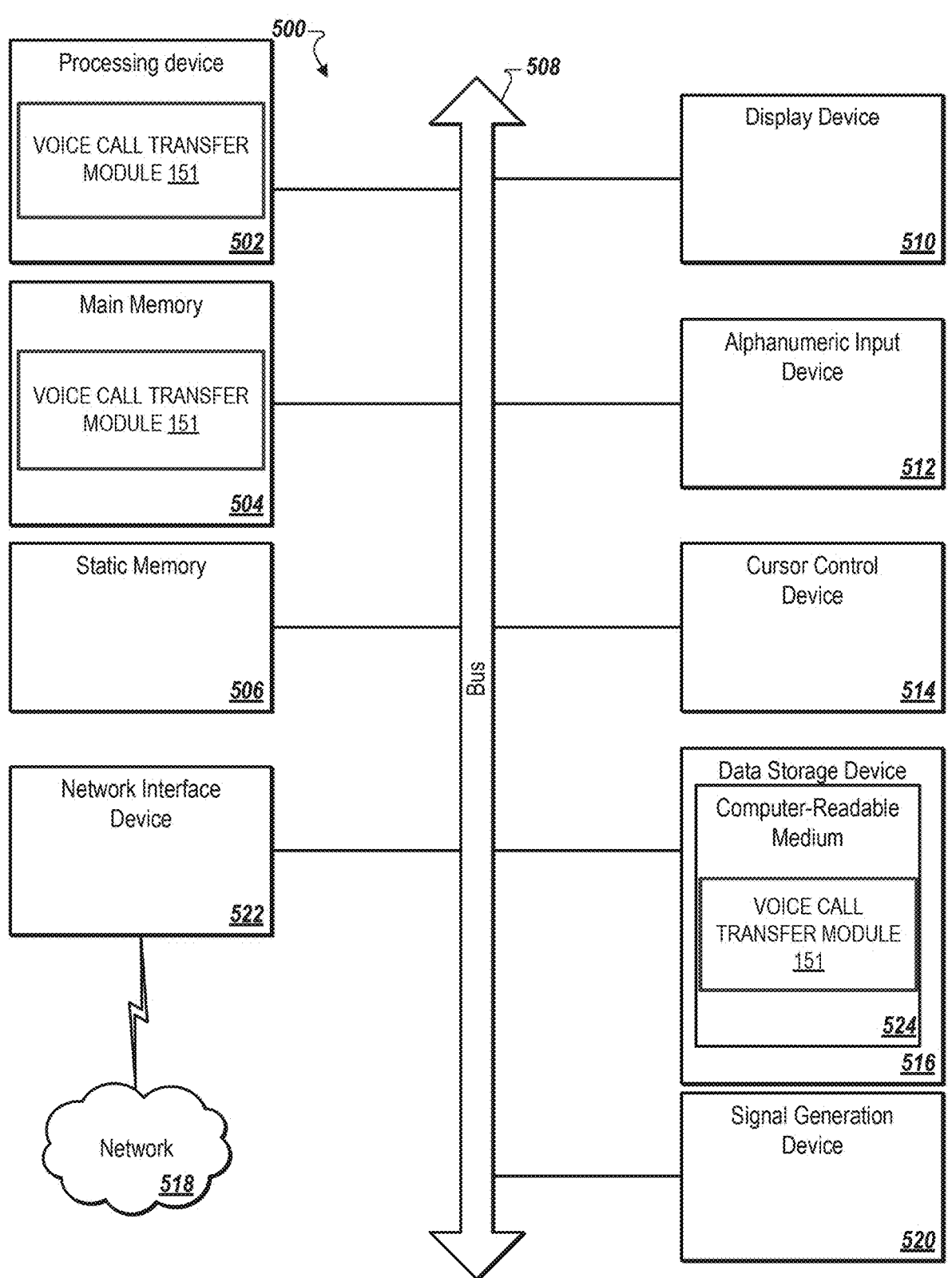
FIG. 5 is a block diagram illustrating an exemplary computer system, in accordance with some embodiments of the disclosure.

FIG. 5 is a block diagram illustrating an exemplary computer system 500, in accordance with an embodiment of the disclosure. The computer system 500 executes one or more sets of instructions that cause the machine to perform any one or more of the methodologies discussed herein. Set of instructions, instructions, and the like may refer to instructions that, when executed by computer system 500, cause computer system 500 to perform one or more operations of voice call transfer module 151. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and voice call transfer module 151 for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100 of voice call transfer module 151 embodying any one or more of the methodologies or functions described herein. The sets of instructions of the system architecture 100 and of voice call transfer module 151 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that causes the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above-described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:

establishing, via a communication services platform, a voice call between a customer device and a first client device associated with a first user account of the communication services platform;

receiving, via an application programming interface (API) call and from a second client device associated with the first user account, a first request to transfer the voice call with the customer device to the second client device; and responsive to receiving the first request to transfer the voice call, establishing, via the communication services platform, the voice call between the customer device and the second client device associated with the first user account.

2. The method of claim 1, wherein establishing, via the communication services platform, the voice call between the customer device and the first client device comprises:

establishing a first connection of the voice call between the customer device and communication services platform using a public switched telephone network (PSTN); and establishing a second connection of the voice call between the communication services platform and first client device using a voice over internet protocol (VOIP) over a network.

3. The method of claim 1, further comprising:

receiving, from the customer device, a second request to initiate the voice call, wherein the second request identifies a recipient telephone number;

obtaining user-defined routing logic associated with an organizational account that corresponds with the recipient telephone number;

identifying, among a plurality of user accounts associated with the organizational account, the first user account based on the user-defined routing logic; and routing the voice call to the first client device associated with the first user account.

4. The method of claim 1, further comprising:

providing, to the second client device, information indicating the second client device is available to receive a transfer of the voice call; and

wherein receiving, via the API call, the first request to transfer the voice call to the second client device associated with the first user account, comprises:

subsequent to providing the information indicating the second client device is available to receive the transfer of the voice call, receiving, from the second client device via the API call, the first request to transfer the voice call to the second client device.

5. The method of claim 1, further comprising:

providing, to the first client device, information indicating one or more other client devices associated with the first user account that are available to receive a transfer of the voice call; and wherein receiving, via the API call, the first request to transfer the voice call to the second client device associated with the first user account, comprises:

subsequent to providing, to the first client device, the information indicating the one or more other client devices associated with the first user account are available to receive the transfer of the voice call, receiving, from the first client device, the first request to transfer the voice call to the second client device; and sending, by the communication services platform and to the second client device, a third request to establish the voice call between the customer device and the second client device.

6. The method of claim 1, further comprising:

subsequent to establishing, via the communication services platform, the voice call between the customer device and the second client device associated with the first user account, muting the voice call for the first client device.

7. The method of claim 1, further comprising:

subsequent to establishing, via the communication services platform, the voice call between the customer device and the second client device associated with the first user account, disconnecting the voice call between the customer device and the first client device.

8. The method of claim 1, further comprising:

assigning one or more of the first client device or the second client device as a host device of the voice call, the host device permitted to end the voice call with the customer device.

9. The method of claim 1, wherein the first client device is a desktop device implementing a web-based application, wherein the second client device is a mobile device implementing a mobile application, and wherein a first set of API calls used for communication between the web-based application and the communication services platform is different from a second set of API calls used for communication between the mobile application and the communication services platform.

10. A system, comprising:

a memory; and a processing device, coupled to the memory, configured to perform operations comprising:

establishing, via a communication services platform, a voice call between a customer device and a first client device associated with a first user account of the communication services platform;

receiving, via an application programming interface (API) call and from a second client device associated with the first user account, a first request to transfer the voice call with the customer device to the second client device; and responsive to receiving the first request to transfer the voice call, establishing, via the communication services platform, the voice call between the customer device and the second client device associated with the first user account.

11. The system of claim 10, wherein establishing, via the communication services platform, the voice call between the customer device and the first client device comprises:

establishing a first connection of the voice call between the customer device and communication services platform using a public switched telephone network (PSTN); and establishing a second connection of the voice call between the communication services platform and first client device using a voice over internet protocol (VOIP) over a network.

12. The system of claim 10, the operations further comprising:

receiving, from the customer device, a second request to initiate the voice call, wherein the second request identifies a recipient telephone number;

obtaining user-defined routing logic associated with an organizational account that corresponds with the recipient telephone number;

identifying, among a plurality of user accounts associated with the organizational account, the first user account based on the user-defined routing logic; and routing the voice call to the first client device associated with the first user account.

13. The system of claim 10, the operations further comprising:

providing, to the second client device, information indicating the second client device is available to receive a transfer of the voice call; and wherein receiving, via the API call, the first request to transfer the voice call to the second client device associated with the first user account, comprises:

subsequent to providing the information indicating the second client device is available to receive the transfer of the voice call, receiving, from the second client device via the API call, the first request to transfer the voice call to the second client device.

14. The system of claim 10, the operations further comprising:

providing, to the first client device, information indicating one or more other client devices associated with the first user account that are available to receive a transfer of the voice call; and wherein receiving, via the API call, the first request to transfer the voice call to the second client device associated with the first user account, comprises:

subsequent to providing, to the first client device, the information indicating the one or more other client devices associated with the first user account are available to receive the transfer of the voice call, receiving, from the first client device, the first request to transfer the voice call to the second client device; and sending, by the communication services platform and to the second client device, a third request to establish the voice call between the customer device and the second client device.

15. The system of claim 10, the operations further comprising:

subsequent to establishing, via the communication services platform, the voice call between the customer device and the second client device associated with the first user account, muting the voice call for the first client device.

16. The system of claim 10, the operations further comprising:

subsequent to establishing, via the communication services platform, the voice call between the customer device and the second client device associated with the first user account, disconnecting the voice call between the customer device and the first client device.

17. The system of claim 10, the operations further comprising:

assigning one or more of the first client device or the second client device as a host device of the voice call, the host device permitted to end the voice call with the customer device.

18. The system of claim 10, wherein the first client device is a desktop device implementing a web-based application, wherein the second client device is a mobile device implementing a mobile application, and wherein a first set of API calls used for communication between the web-based application and the communication services platform is different from a second set of API calls used for communication between the mobile application and the communication services platform.

19. A non-transitory computer-readable medium comprising instructions that, responsive to execution by a processing device, cause the processing device to perform operations, comprising:

establishing, via a communication services platform, a voice call between a customer device and a first client device associated with a first user account of the communication services platform;

receiving, via an application programming interface (API) call and from a second client device associated with the first user account, a first request to transfer the voice call with the customer device to the second client device; and responsive to receiving the first request to transfer the voice call, establishing, via the communication services platform, the voice call between the customer device and the second client device associated with the first user account.

20. The non-transitory computer-readable medium of claim 19, wherein establishing, via the communication services platform, the voice call between the customer device and the first client device comprises:

establishing a first connection of the voice call between the customer device and communication services platform using a public switched telephone network (PSTN); and establishing a second connection of the voice call between the communication services platform and first client device using a voice over internet protocol (VOIP) over a network.

* * * * *